US012798806B2

(12) United States Patent
Sekiguchi et al.

(10) Patent No.: US 12,798,806 B2
(45) Date of Patent: Nov. 17, 2026

(54) MOVING DEVICE AND UNMANNED AERIAL DEVICE

(71) Applicant: JDC Corporation, Tokyo (JP)

(72) Inventors: Masakazu Sekiguchi, Tokyo (JP); Hidetoshi Morimoto, Tokyo (JP); Hiroshi Obata, Tokyo (JP); Tsukasa Baba, Tokyo (JP)

(73) Assignee: JDC Corporation, Tokyo (JP)

( * ) Notice: Subject to any disclaimer, the term of this patent is extended or adjusted under 35 U.S.C. 154(b) by 0 days.

(21) Appl. No.: 18/833,793

(22) PCT Filed: Dec. 9, 2022

(86) PCT No.: PCT/JP2022/045446
§ 371 (c)(1),
(2) Date: Jul. 26, 2024

(87) PCT Pub. No.: WO2023/162405
PCT Pub. Date: Aug. 31, 2023

(65) Prior Publication Data

US 2025/0108943 A1 Apr. 3, 2025

Related U.S. Application Data

(60) Provisional application No. 63/312,422, filed on Feb. 22, 2022.

(51) Int. Cl.
*B64U 80/86* (2023.01)
*B64U 10/13* (2023.01)
(Continued)

(52) U.S. Cl.
CPC ............ *B64U 80/86* (2023.01); *B64U 10/13* (2023.01); *B64U 10/20* (2023.01); *B64U 20/87* (2023.01); *B64U 80/20* (2023.01)

(58) Field of Classification Search
CPC ........ B64U 80/86; B64U 10/13; B64U 10/20; B64U 20/87; B64U 80/20; B64U 70/93; B64U 80/25
See application file for complete search history.

(56) References Cited

U.S. PATENT DOCUMENTS 7,152,547 B1 * 12/2006 Hovland ................. B63B 17/00 114/261
9,387,940 B2 * 7/2016 Godzdanker ............. B64F 1/28
(Continued)

FOREIGN PATENT DOCUMENTS

CN 105875572 A 8/2016
CN 207433831 U 6/2018
(Continued)

*Primary Examiner* — Medhat Badawi
(74) *Attorney, Agent, or Firm* — Young Basile Hanlon & MacFarlane, P.C.

(57) ABSTRACT

A moving device that allows an unmanned aerial vehicle to easily take off and land on is described. The moving device includes a main body device that travels by a traveling device, a takeoff and landing unit that is provided in the main body device and used by an unmanned aerial vehicle to take off and land and, and a leveling table that is provided in the takeoff and landing unit. The inclination of the leveling table is adjustable with respect to the vertical axis.

20 Claims, 8 Drawing Sheets

(51) Int. Cl.

| | |
|---|---|
| ***B64U 10/20*** | (2023.01) |
| ***B64U 20/87*** | (2023.01) |
| ***B64U 80/20*** | (2023.01) |

(56) References Cited

U.S. PATENT DOCUMENTS

| | | | | |
|---|---|---|---|---|
| 10,310,500 | B1 * | 6/2019 | Brady | G07C 9/00182 |
| 10,351,239 | B2 * | 7/2019 | Di Benedetto | G08G 5/57 |
| 10,364,025 | B2 * | 7/2019 | Krishnamoorthy | G05D 1/104 |
| 10,514,690 | B1 * | 12/2019 | Siegel | G05D 1/0027 |
| 10,767,347 | B2 * | 9/2020 | Nishi | E02F 9/262 |
| 10,877,486 | B2 * | 12/2020 | Tamasato | G05D 1/0278 |
| 11,008,119 | B2 * | 5/2021 | Shibata | B64U 70/93 |
| 11,565,807 | B1 * | 1/2023 | Zuckerman | G05D 1/101 |
| 11,748,688 | B2 * | 9/2023 | Ur | B64C 39/024 705/332 |
| 11,932,315 | B2 * | 3/2024 | Hwang | B64F 1/32 |
| 12,065,273 | B2 * | 8/2024 | Kiyokami | B64U 10/13 |
| 12,104,359 | B2 * | 10/2024 | Carpenter | E02F 9/2825 |
| 12,145,746 | B2 * | 11/2024 | Hwang | B64F 1/32 |
| 12,195,213 | B2 * | 1/2025 | Qi | B64U 70/97 |
| 12,214,902 | B2 * | 2/2025 | Infanti | G05D 1/0202 |
| 12,252,279 | B1 * | 3/2025 | Collings | B64U 10/13 |
| 2005/0230537 | A1 * | 10/2005 | Chouery | B64F 1/007 244/116 |
| 2008/0097693 | A1 * | 4/2008 | McCain | E02F 9/2045 701/50 |
| 2009/0236470 | A1 * | 9/2009 | Goossen | B64U 70/80 244/115 |
| 2010/0224118 | A1 * | 9/2010 | Hovland | B63B 35/50 114/261 |
| 2010/0283675 | A1 * | 11/2010 | McAree | E02F 3/435 342/357.28 |
| 2011/0315810 | A1 * | 12/2011 | Petrov | B64U 10/60 244/17.11 |
| 2014/0070052 | A1 * | 3/2014 | Kang | B64F 1/007 244/114 R |
| 2014/0124621 | A1 * | 5/2014 | Godzdanker | B64F 1/125 244/110 E |
| 2015/0379468 | A1 * | 12/2015 | Harvey | G05D 1/667 705/338 |
| 2016/0009413 | A1 * | 1/2016 | Lee | G08G 5/57 701/16 |
| 2016/0185466 | A1 * | 6/2016 | Dreano, Jr. | G06Q 10/083 705/26.81 |
| 2016/0196756 | A1 * | 7/2016 | Prakash | B64U 80/25 701/3 |
| 2016/0237640 | A1 * | 8/2016 | Carpenter | E02F 9/2841 |
| 2016/0257423 | A1 * | 9/2016 | Martin | A47G 29/14 |
| 2017/0038779 | A1 * | 2/2017 | Fujimori | G05D 1/102 |
| 2017/0137150 | A1 * | 5/2017 | Conyers | B60K 1/02 |
| 2017/0316701 | A1 * | 11/2017 | Gil | G06Q 10/0832 |
| 2017/0355459 | A1 * | 12/2017 | Erickson | G08G 5/34 |
| 2018/0101173 | A1 * | 4/2018 | Banerjee | G08G 5/80 |
| 2018/0165973 | A1 * | 6/2018 | Chun | B64U 10/13 |
| 2018/0245365 | A1 * | 8/2018 | Wankewycz | B64U 10/13 |
| 2018/0258608 | A1 * | 9/2018 | Uetake | B65G 15/00 |
| 2018/0282970 | A1 * | 10/2018 | Koga | E02F 9/261 |
| 2018/0327091 | A1 * | 11/2018 | Burks | B64U 50/13 |
| 2019/0031346 | A1 * | 1/2019 | Yong | A01M 7/0042 |
| 2019/0039731 | A1 * | 2/2019 | Marcath | B64U 80/25 |
| 2019/0043370 | A1 * | 2/2019 | Mulhall | G08G 5/26 |
| 2019/0106224 | A1 * | 4/2019 | Nishikawa | B64U 50/37 |
| 2019/0135403 | A1 * | 5/2019 | Perry | B64U 10/25 |
| 2019/0138028 | A1 * | 5/2019 | Coleman | G05D 1/0684 |
| 2019/0212735 | A1 * | 7/2019 | Fujiwara | G05D 1/0212 |
| 2019/0235526 | A1 * | 8/2019 | Chen | G05D 1/0022 |
| 2019/0276162 | A1 * | 9/2019 | Shibata | B64F 1/007 |
| 2019/0279494 | A1 * | 9/2019 | Raasch | G08B 25/10 |
| 2020/0122831 | A1 * | 4/2020 | Rivaya | G06Q 10/083 |
| 2020/0191581 | A1 * | 6/2020 | Chun | G06Q 10/047 |
| 2020/0218286 | A1 * | 7/2020 | Tamasato | G05D 1/0684 |
| 2020/0385119 | A1 * | 12/2020 | Hanke | E06B 3/2605 |
| 2021/0208606 | A1 * | 7/2021 | Nakazawa | B64U 10/13 |
| 2021/0279678 | A1 * | 9/2021 | Ur | G06Q 10/08355 |
| 2022/0315248 | A1 * | 10/2022 | Castellano Aldave | B60L 3/00 |
| 2023/0182932 | A1 * | 6/2023 | Rodrigues | B64U 20/87 118/712 |
| 2023/0376883 | A1 * | 11/2023 | Ur | G06Q 10/047 |
| 2024/0026657 | A1 * | 1/2024 | Sekiguchi | B64U 10/13 |
| 2024/0309605 | A1 * | 9/2024 | Sekiguchi | B02C 23/02 |
| 2025/0108943 | A1 * | 4/2025 | Sekiguchi | B64U 70/99 |
| 2025/0115354 | A1 * | 4/2025 | Suzuki | B64C 39/024 |
| 2025/0115379 | A1 * | 4/2025 | Schmucki | B64U 10/20 |

FOREIGN PATENT DOCUMENTS

| | | | |
|---|---|---|---|
| CN | 111657252 | A | 9/2020 |
| JP | 2019-093981 | A | 6/2019 |
| WO | 2019/026169 | A1 | 2/2019 |
| WO | 2019/171748 | A1 | 9/2019 |

* cited by examiner

MOVING DEVICE AND UNMANNED AERIAL DEVICE

TECHNICAL FIELD

The present invention relates to a moving device and an unmanned aerial device and, in particular, relates to a moving device that allows an unmanned aerial vehicle to easily take off and land on and a space-efficient unmanned aerial device.

BACKGROUND

Conventionally, it has been proposed to provide a takeoff and landing port for an unmanned aerial vehicle to take off from and land on a working machine such as a hydraulic excavator or a bulldozer. For example, WO Patent Application No. 2019/026169 A discloses that an unmanned aerial vehicle is charged at the takeoff and landing port.

SUMMARY

WO Patent Publication No. 2019/026169 A does not take into account the use of a working machine on sloped ground. The unmanned aerial vehicle may not be able to take off or land on a working machine when the takeoff and landing port is inclined. In addition, WO Patent Publication No. 2019/026169 A does not disclose supplying a fluid to an unmanned aerial vehicle.

An object of the invention is to provide a moving device that allows an unmanned aerial vehicle to easily take off and land on.

Another object of the invention is to provide a space-efficient unmanned aerial device even in a case where a power reception device and a fluid device are provided.

A moving device according to a first embodiment includes a main body device that travels by a traveling device. The moving device also includes a takeoff and landing unit that is provided in the main body device and used by an unmanned aerial vehicle to take off and land. The moving device also includes a leveling unit that is provided in the takeoff and landing unit and in which an amount of inclination with respect to a vertical axis is adjustable.

An unmanned aerial device according to a second embodiment includes a flight device having a propeller. The unmanned aerial device also includes a second engagement portion that engages, when landing on a landing unit, with a first engagement portion provided in the landing unit. The unmanned aerial device also includes a power reception device provided outside the second engagement portion. The unmanned aerial device also includes a fluid device provided inside the second engagement portion.

According to the first embodiment, because the leveling unit in which an amount of inclination with respect to the vertical axis is adjustable is provided in the takeoff and landing unit, it is possible to achieve a moving device that allows an unmanned aerial vehicle to easily take off and land on.

According to the second embodiment, because the power reception device is provided outside the second engagement portion and the fluid device is provided inside the second engagement portion, it is possible to achieve a space-efficient unmanned aerial device.

DETAILED DESCRIPTION

Hereinafter, embodiments of a construction machine of the present invention will be described in detail with reference to the accompanying drawings. Note that the present invention is not limited to the embodiments described below. In the first embodiment, the description is provided, taking an example of a conveyance device 1. The conveyance device supports an unmanned aerial vehicle (UAV), hereinafter referred to as a drone 100, which is an unmanned aircraft that flies over a sloped ground. In the following description, for convenience, a vertical direction is defined as a Z direction, and two axial directions orthogonal to each other in a horizontal plane are defined as an X direction and a Y direction.

First Embodiment

Figure 1:
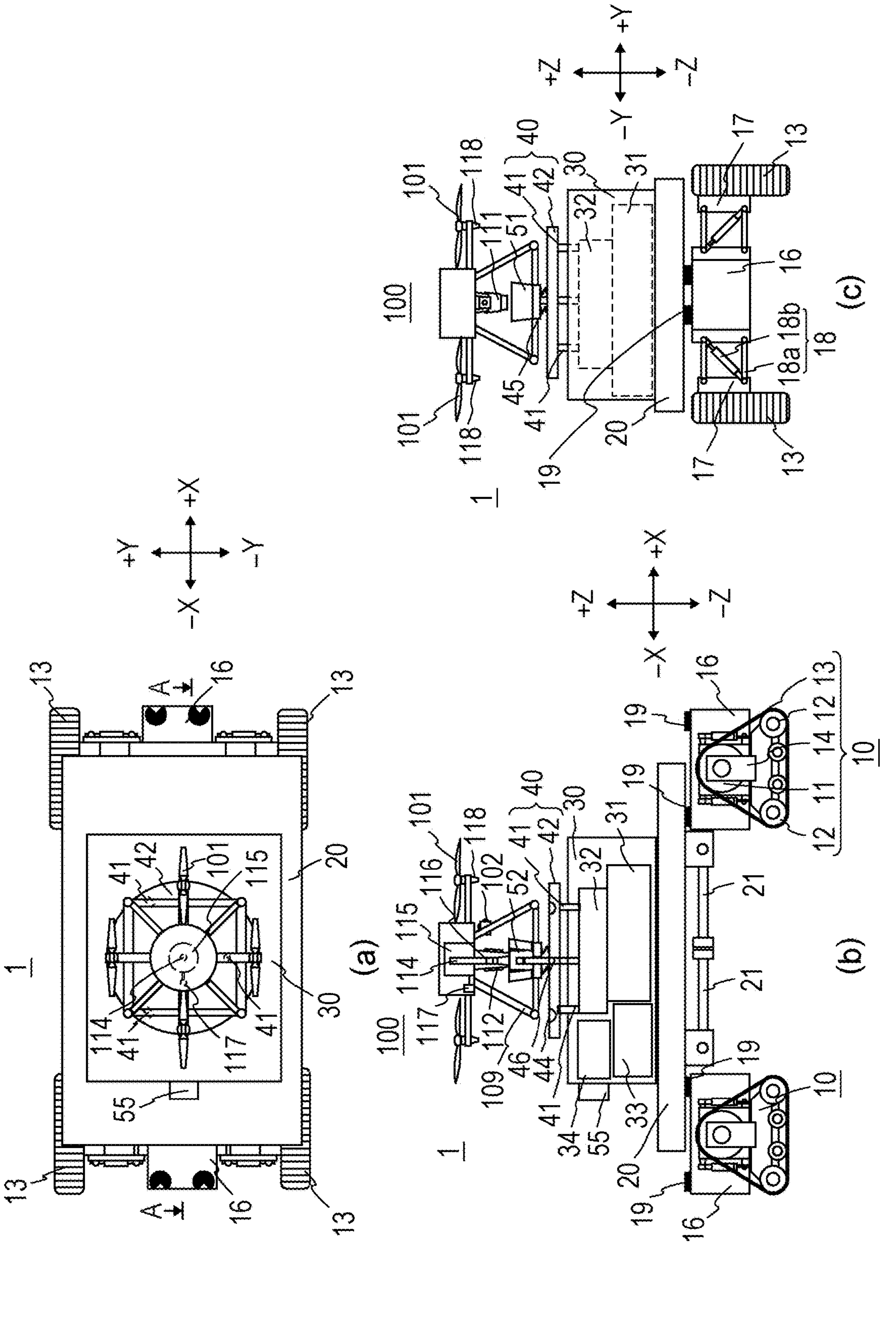
FIG. 1 is a schematic view of a conveyance device according to a first embodiment, in which FIG. 1(*a*) is a top view, FIG. 1(*b*) is a front view, and FIG. 1(*c*) is a side view.
Figure 2:
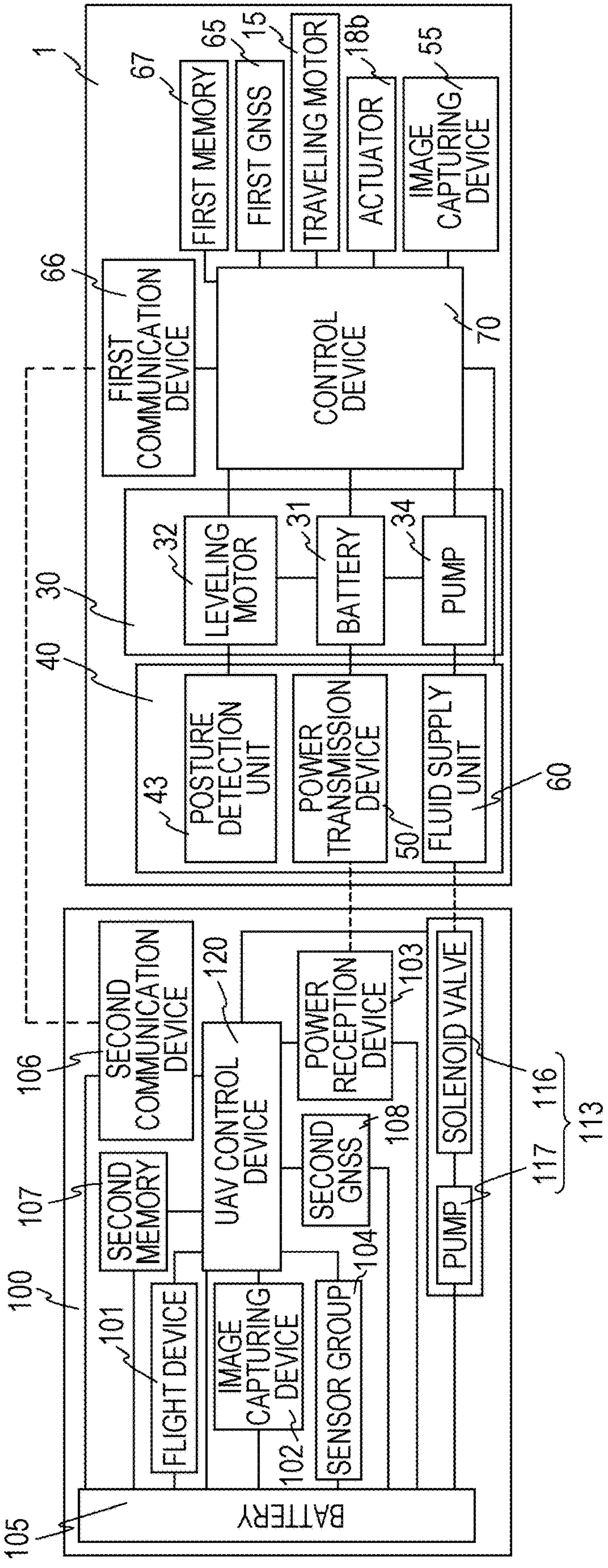
FIG. 2 is a block diagram of main parts of a conveyance device and a drone according to the first embodiment.

FIG. 1 is a schematic view of the conveyance device 1 according to the first embodiment, in which FIG. 1(*a*) is a top view, FIG. 1(*b*) is a front view, and FIG. 1(*c*) is a side view. FIG. 2 is a block diagram of main parts of the conveyance device 1 and the drone 100 according to the first embodiment. First, the configuration of the conveyance device 1 will be described with reference to FIGS. 1 and 2. FIG. 1(*b*) illustrates an A-A cross section of FIG. 1(*a*).

Note that the conveyance device 1 of the first embodiment is an autonomous driving type without a driver's seat or a remote driving type. The conveyance device 1 includes a traveling device 10, a base unit 20, a main body unit 30, a leveling unit 40, a power transmission device 50 (also called a power supply unit), and a fluid supply unit 60. The conveyance device 1 also includes an image capturing device 55, a first global navigation satellite system (GNSS) 65, a first communication device 66, a first memory 67, and a controller or control device 70.

The traveling device 10 serves to move the conveyance device 1. The traveling device 10 also includes a drive wheel 11, driven wheels 12, a crawler belt 13, and a support 14. The traveling device 10 also includes a traveling motor 15, a center frame 16, a pair of side frames 17, a pair of link mechanisms 18, and a coupler 19. In the first embodiment, the traveling device 10 is attachable to and detachable from the base unit 20 by the coupler 19 as described in further detail below.

In the first embodiment, the one drive wheel 11 and the two driven wheels 12 form a triangular shape. A plurality of driven wheels smaller than the two driven wheels 12 is provided between the two driven wheels 12.

The crawler belt 13 is wound around the one drive wheel 11 and the two driven wheels 12. The support 14 rotatably supports the drive wheel 11 and the driven wheels 12. Because the number of triangular crawler belt type traveling bodies of the first embodiment is four, the conveyance device 1 can stably travel even on an uneven ground. A caterpillar, as the traveling device 10, may be wound around the front wheels. Alternatively, or in addition thereto, the caterpillar may be wound around the rear wheels.

In the first embodiment, the traveling motor 15 (see FIG. 2) employs an in-wheel motor that is provided on the back surface side of the drive wheel 11 and transmits a driving force to the drive wheel 11. A rotating shaft of the in-wheel motor is connected to a rotating shaft of the drive wheel 11, and the drive wheel 11 is rotated by a rotational driving force of the in-wheel motor. The driving force is transmitted to the crawler belt 13. The traveling motor 15 may be a motor different from the in-wheel motor.

The center frame 16 is a frame positioned between the two drive wheels 11 separated in the Y direction. The center frame 16 is connected to the pair of side frames 17 via the pair of link mechanisms 18. The coupler 19 for coupling to the base unit 20 is provided on the upper surface of the center frame 16.

The pair of side frames 17 are frames connected to the corresponding drive wheels 11 via bearings (not illustrated).

Each of the link mechanisms 18 has a Z shape or an inverted Z shape, and includes a pair of connection members **18*a* having one end connected to the side frame 17 and the other end connected to the center frame 16. Each of the link mechanisms 18 also includes an actuator 18*b* having one end connected to the connection member 18*a* on the center frame 16 side and the other end connected to the connection member 18*a* on the side frame 17 side. Note that the two connection members 18*a*** making one pair are provided apart from each other in the Z direction.

The actuators **18*b* are provided at an angle, and the actuators 18*b* are extended or retracted to drive the pair of side frames 17 in the Z direction and the Y direction. The actuators 18*b* move the drive wheels 11, the driven wheels 12, and the crawler belts 13 in the Z direction and the Y direction via the pair of side frames 17. Accordingly, the traveling devices 10 can change the dimensions (size) in the Z direction and the Y direction. The actuators 18*b*** can be hydraulic jacks or electric jacks, but the actuators are not limited thereto.

In the first embodiment, the coupler 19 has a V-shaped notch, and four couplers are provided on the upper surface of the base unit 20, but the number of couplers may be one, and the number thereof can be arbitrarily set. The coupler 19 couples the traveling device 10 and the base unit 20 to each other by engaging a pin (not illustrated) extending in the −Z direction provided on the lower surface of the base unit 20 with the V-shaped notch. The coupler 19 releases the coupling between the traveling device 10 and the base unit 20 by disengaging from the pin. Note that a coupling structure between the coupler 19 and the pin is disclosed in, for example, JP Patent Publication No. JP 2000-006856 A. Alternatively, the coupler 19 and the pin may be attached to/detached from each other by an electromagnet.

In the first embodiment, the base unit 20 is a rectangular member. The main body unit 30 is placed on the upper surface of the base unit 20, and leg portions 21 that are foldable are provided on the lower surface of the base unit 20. Each of the leg portions 21 is a member that allows the base unit 20 to stand on its own before and after attachment to and detachment from the traveling device 10. In the first embodiment, the two leg portions 21 are provided in the base unit 20, but the number thereof can be arbitrarily set. Further, the shape of the base unit 20 is not limited to the rectangular shape and may be any shape such as an elliptical shape. Further, the position of the base unit 20 in the Z direction can be changed by driving the actuators **18*b***.

The main body unit 30 is fixed to the upper surface of the base unit 20. The main body unit houses therein a battery 31 that supplies power to electrical constituent elements such as the traveling motor 15 and the actuators **18*b*, a leveling motor 32 that drives the leveling unit 40, a container 33 that stores a fluid therein, and a pump 34 that can discharge the fluid to the drone 100**.

The battery 31 is a secondary battery that can be repeatedly charged and discharged. The battery 31 may be a lithium ion secondary battery, a lithium polymer secondary battery, or the like. The battery 31 can be charged by a constant current constant voltage power reception method in the case of a lithium ion secondary battery and can be charged by constant current charging in the case of a nickel-metal hydride secondary battery or a nickel-cadmium secondary battery. The battery 31 supplies power to all the electrical constituent elements of the conveyance device 1, although some elements are not illustrated in the block diagram of FIG. 2.

The leveling motor 32 is a motor for independently driving three drive shafts 41, described later, constituting the leveling unit 40 along the Z direction. In the first embodiment, three direct current (DC) motors are used as the leveling motor 32, but the leveling motor 32 is not limited thereto. The leveling motor 32 is driven by power supplied from the battery 31.

The container 33 is a container that stores a fluid such as a liquid or a gas, and supplies a liquid, e.g., a pesticide, a cleaning liquid, a chemical liquid, pure water, or drinking water in the first embodiment. In a case where the drone flies on a gaseous fuel, the gaseous fuel (hydrogen, oxygen, or the like) may be stored in the container 33.

The pump 34 is a pump that supplies the fluid stored in the container 33 to the drone 100 via the fluid supply unit 60 to be described later. In the first embodiment, the pump 34 may be a DC pump or a DC electromagnetic motor using an electromagnet instead of the motor. The pump 34 is driven by power supplied from the battery 31.

The leveling unit 40 includes the three drive shafts 41, a table unit 42, a posture detection unit 43 (e.g., a detection sensor that detects inclination), a holding portion 44, a spring 45, and an opening 46. The leveling unit 40 functions as a takeoff and landing unit where the drone 100 takes off and lands on in the first embodiment.

The three drive shafts 41 are arranged such that intervals between the drive shafts 41 are equal. Each of the drive shafts 41 has one end connected to the main body unit 30 side and the other end connected to the table unit 42. The three drive shafts 41 are driven along the Z direction by the leveling motor 32. That is, an amount of inclination of the table unit 42 with respect to the vertical axis is adjustable.

Figure 3:
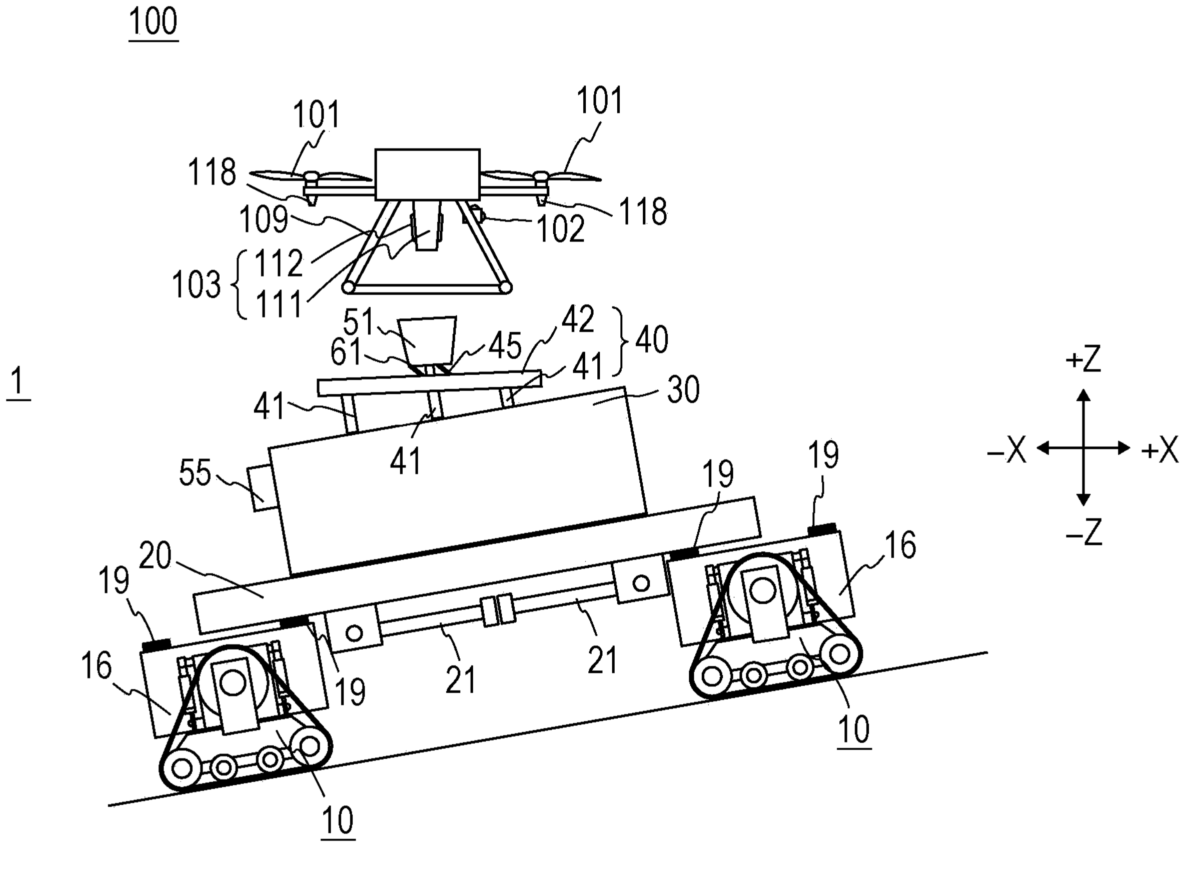
FIG. 3 is a schematic view illustrating a state in which a conveyance device is on a sloped ground and a drive shaft is driven.

FIG. 3 is a schematic view illustrating a state in which the conveyance device 1 is on a sloped ground and the drive shafts 41 are driven. The table unit 42 can be leveled by driving the drive shafts 41 by the leveling motor 32. This enables the drone 100 to easily take off from and land on the table unit 42.

The table unit 42 is provided on the upper surface side (+Z side) of the main body unit 30. The table unit 42 has a size that allows the drone 100 to take off or land. In FIG. 1, the table unit 42 has a size such that one drone 100 lands on, but the table unit 42 may have a size such that two or more drones 100 take off from or land thereon. In this case, the number of leveling units 40 may be one, or a plurality of leveling units may be provided according to the number of drones 100. The shape of the table unit 42 is circular in the first embodiment, but the shape may be rectangular.

The posture detection unit 43 (not illustrated in FIG. 1) is provided on the upper surface or the lower surface of the table unit 42 and detects the posture of the table unit 42. As the posture detection unit 43, an inclinometer, a level, or the like can be used. The drive shafts 41 described above are driven based on the detection result of the posture detection unit 43.

The holding portion 44 engages with a leg portion 109, described later, provided on the drone 100 to hold the drone 100 on the table unit 42. In the first embodiment, the holding portion 44 is provided in the table unit 42 and is a rectangular groove engageable with the leg portion 109. Note that the shape of the groove can be any shape according to the shape of the leg portion 109. Alternatively, the holding portion 44 may be a lock mechanism that mechanically or electromagnetically locks the leg portion 109 instead of the groove.

The spring 45 is an elastic member that has one end connected to the table unit 42 and the other end connected to the power transmission device 50 (first engagement portion 51 described later). When the drone 100 lands on the table unit 42, the spring 45 is elastically deformed so as to be compressed under the weight of the drone 100. At this time, the power transmission device 50 is held by the table unit 42.

The opening 46 is a through hole provided in the table unit 42. In the first embodiment, the opening 46 is provided at the center of the table unit 42 and serves as a path for routing the wiring of the power transmission device 50 between the leveling unit 40 and the power transmission device 50.

The opening 46 serves as a path for routing a supply pipe 61, described later, between the leveling unit 40 and the fluid supply unit 60.

The power transmission device 50 (see FIG. 4) is provided on the upper surface side (+Z side) of the table unit 42 via the spring 45. The power transmission device 50 is to supply power to a power reception device 103, described later, provided on the drone 100. The power transmission device 50 includes the first engagement portion 51, a power transmission electrode 52, and a switch (not illustrated).

The first engagement portion 51 is engageable with a second engagement portion 111, described later, of the drone 100. The first engagement portion 51 has a tapered opening that decreases in diameter toward the table unit 42 side (−Z side) on the inner side of the first engagement portion 51.

The power transmission electrode 52 is provided in the tapered portion, and power is supplied through contact with a power reception electrode 112 provided in a tapered portion of the power reception device 103. The power transmission electrode 52 and the battery 31 are connected by wiring passing through the opening 46.

Wireless power transfer may be used for power feeding between the power transmission device 50 and the power reception device 103. The wireless power transfer is to supply power in a non-contact manner, and a magnetic resonance system, an electromagnetic induction system, and the like are known. The switch (not illustrated) is an on/off switch that determines whether power is supplied to the power reception device 103 by the power transmission device 50.

The fluid supply unit 60 (see FIG. 4) serves to supply the fluid from the pump 34 to the drone 100. In the first embodiment, the fluid supply unit 60 includes a supply pipe 61, a joint 62, and a packing 63.

The supply pipe 61 is provided such that one end thereof is connected to the pump 34 and the other end thereof is located inside the first engagement portion 51 via the opening 46. The joint 62 has a tapered shape to be engaged with a pipe portion 114, described later, and is provided on the other end side of the supply pipe 61.

The packing 63 is provided on the joint 62 and is an elastically deformable rubber packing in the first embodiment. Instead of the opening 46, the drive shaft 41 may be configured to have a hollow shape, and the hollow portion may be used to route the supply pipe 61 and an electric wire. Preferably, but not necessarily, the supply pipe 61 and the electric wire are routed through a hollow portion of the drive shafts 41 different from the supply pipe 61 and the electric wire.

In the first embodiment, because at least one of a part of the power transmission device 50 that supplies power to the drone 100 and a part of the fluid supply unit 60 that supplies a fluid to the drone 100 are provided in the first engagement portion 51, it is possible to supply power and a fluid by engaging the second engagement portion 111, described later, with the first engagement portion 51. This arrangement prevents an increase in size of the drone 100.

The image capturing device 55 is a digital camera that includes a lens, an imaging element, an image processing engine, and the like. The image capturing device 55 captures a moving image and a still image. In the first embodiment, the image capturing device 55 is provided on a side surface of the main body unit 30 on the traveling direction side (−X side) of the conveyance device 1. Based on an image captured by the image capturing device 55 and location information measured by the first GNSS 65, the conveyance device 1 drives autonomously or is operated remotely. In a case where the conveyance device 1 is operated remotely, the image captured by the image capturing device 55 and the location information measured by the first GNSS 65 are transmitted to a central control device remotely located from the conveyance device 1. The number of image capturing devices 55 provided in the main body unit 30 may be plural. The image capturing devices 55 may be respectively provided in the left, right, front, and back directions of the main body unit 30.

In addition, instead of the image capturing device 55 or in combination with the image capturing device 55, light detection and ranging (LiDAR) that emits electromagnetic waves may be employed. LiDAR may detect an obstacle or a road surface shape around the conveyance device 1, a road width, or a distance to the destination.

The first GNSS 65 serves to measure a location of the conveyance device 1 by using an artificial satellite. The first communication device 66 is a wireless communication unit that includes a transmitter, a receiver, various circuits, an antenna (not illustrated), and the like. The first communication device 66 may access a second communication device 106, described later, provided in the drone 100 or a wide area network such as the Internet. In the first embodiment, the first communication device 66 transmits the location of the table unit 42 to the second communication device 106 based on the location of the conveyance device 1 detected by the first GNSS 65.

The first memory 67 is a nonvolatile memory (for example, a flash memory). The first memory 67 stores various types of data and programs used for driving each component of the conveyance device 1 and various types of data and programs used for the conveyance device 1 to drive autonomously.

The control device 70 includes a CPU, controls the entire conveyance device 1, and cooperates with the drone 100. In the first embodiment, the control device 70 cooperates with a UAV control device 120 of the drone 100 to perform landing control of the drone 100, control of a series of operations for supplying power and a fluid to the drone 100, and the like. In addition, the control device 70 controls the posture of the leveling unit 40 (e.g., prior to landing of the drone 100) based on the detection result of the posture detection unit 43. Further, in a case where the conveyance device 1 moves in a narrow space, the control device 70 may drive the actuators 18*b* to reduce the width of the pair of crawler belts 13 separated in the Y direction. In addition, to cross over an obstacle, the control device 70 may drive the actuators 18*b* to increase the height of the center frame 16 in the Z direction.

Drone

The drone 100 of the first embodiment includes flight devices 101, an image capturing device 102, the power reception device 103, a sensor group 104, a battery 105, the second communication device 106, a second memory 107, the leg portion 109, a fluid device 113, and the UAV control device 120.

The flight devices 101 each include a motor (not illustrated) and a plurality of propellers. The flight devices 101 generate thrust to float the drone 100 in the air and to move the drone 100 in the air. The number of drones 100 that land on the takeoff and landing unit can be optionally set. In this case, the configurations of the drones 100 may be the same, or a part thereof may be changed. Moreover, the sizes of the drones 100 may be the same as or different from the other drones.

The image capturing device 102 is a digital camera that includes a lens, an imaging element, and an image processing engine. The image capturing device 102 captures a moving image and a still image. In the present embodiment, the image capturing device 102 is provided below the main body of the drone 100. The image capturing device 102 includes a mechanism that changes the posture such that the orientation of the lens can be changed. This mechanism enables the image capturing device 102 to position the lens at various positions and capture images at various angles. Note that an omnidirectional camera (360-degree camera) may be used as the image capturing device 102. Furthermore, a three-dimensional scanner (e.g., LiDAR) may be used instead of the image capturing device 102.

The power reception device 103 includes the second engagement portion 111 and the power reception electrode 112. The second engagement portion 111 has a tapered portion whose diameter decreases toward the lower side (−Z side) and is engageable with the tapered opening inside the first engagement portion 51. The power reception electrode 112 is provided in the outer tapered portion of the second engagement portion 111. The power reception electrode 112 receives power by contact with the power transmission electrode 52. The power transmission electrode 52 and the power reception electrode 112 contact each other above the tip of the second engagement portion 111. Thus, even when a liquid leaks from the pipe portion 114, a risk that the liquid is applied to the power transmission electrode 52 and the power reception electrode 112 is reduced.

The sensor group 104 is a GNSS, an infrared sensor for avoiding a collision between the drone 100 and another device (for example, the working device 260), an atmospheric pressure sensor that measures an altitude, a magnetic sensor that detects an azimuth, a gyro sensor that detects a posture of the drone 100, an acceleration sensor that detects acceleration acting on the drone 100, and the like.

The battery 105 is a secondary battery connected to the power reception device 103. A lithium ion secondary battery, a lithium polymer secondary battery, or the like can be used as the battery 105, but the battery 105 is not limited thereto. The battery 105 can supply power to the flight devices 101, the image capturing device 102, the second communication device 106, the second memory 107, the fluid device 113, and the UAV control device 120.

The second communication device 106 includes a wireless communication unit. The second communication device 106 accesses a wide area network such as the Internet and communicates with a first communication device 48. In the present embodiment, the second communication device 106 transmits image data captured by the image capturing device 102 and a detection result detected by the sensor group 104 to the first communication device 48. The first communication device 48 transmits the location of the conveyance device 1 (location of the table unit 42, for example) to the UAV control device 120.

The second memory 107 is a nonvolatile memory (for example, a flash memory) that stores various types of data and programs used for causing the drone 100 to fly. The second memory 107 also stores image data captured by the image capturing device 102, a detection result detected by the sensor group 104, and the like.

A second GNSS 108 measures a location of the drone 100 by using an artificial satellite.

The leg portion 109 extends below (−Z side) the drone 100 and engages with a landing surface when the drone 100 lands on to support the drone 100. In the first embodiment, the leg portion 109 has a shape to be engaged with the groove of the holding portion 44 when the drone 100 lands on the table unit 42 that is the takeoff and landing unit. Because the leg portion 109 is engaged with the holding portion 44, the drone 100 does not fall off from the table unit 42 even if the conveyance device 1 is inclined.

The fluid device 113 receives a fluid from the fluid supply unit 60 and supplies the fluid toward an object when the drone 100 flies. The fluid device 113 includes the pipe portion 114, a tank 115, a solenoid valve 116, a pump 117, and a nozzle 118.

The pipe portion 114 is partially provided inside the second engagement portion 111 and has a tapered portion to be engaged with the joint 62 via the packing 63. The pipe portion 114 guides the fluid supplied from the fluid supply unit 60 to the tank 115.

The tank 115 stores the fluid supplied from the pipe portion 114. The tank 115 is provided with a flow meter (not illustrated).

The solenoid valve 116 opens and closes the valve by turning on and off the current to the electromagnet. The solenoid valve 116 controls the supply of the fluid to the pipe portion 114. In the first embodiment, the solenoid valve 116 is normally in the closed state, and the solenoid value 116 opens when the drone 100 lands on the table unit 42 and the fluid is supplied to the tank 115. In addition, the solenoid valve 116 is closed according to the output of the flow meter (not illustrated) provided in the tank 115.

The pump 117 is a pump that guides the fluid stored in the tank 115 to the nozzle 118. In the first embodiment, a DC pump is used as the pump 117.

The nozzle 118 is a component that supplies a fluid toward the object. In the first embodiment, the nozzle 118 is provided below the flight devices 101. The nozzle 118 supplies a fluid in response to on/off control of the pump 117. Note that the number of nozzles 118 can be optionally set.

The UAV control device 120 includes a CPU, a posture control circuit, and a flight control circuit, and the UAV control device 120 controls the entire drone 100. Further, in addition to the landing control of the drone 100, the UAV control device 120 determines the timing of charging at the takeoff and landing unit based on the remaining amount of the battery 105. The UAV control device 120 determines the timing of fluid supply at the takeoff and landing unit based on the remaining amount in the tank 115. Further, the UAV control device 120 controls an image capturing position, an angle of view, a frame rate, and the like of the image capturing device 102.

If image capturing is performed by the image capturing device 102 while the drone 100 lands on the table unit 42, the imaging capturing can be performed from substantially the same position as that from a driver's seat of a conventional conveyance device.

Figure 4:
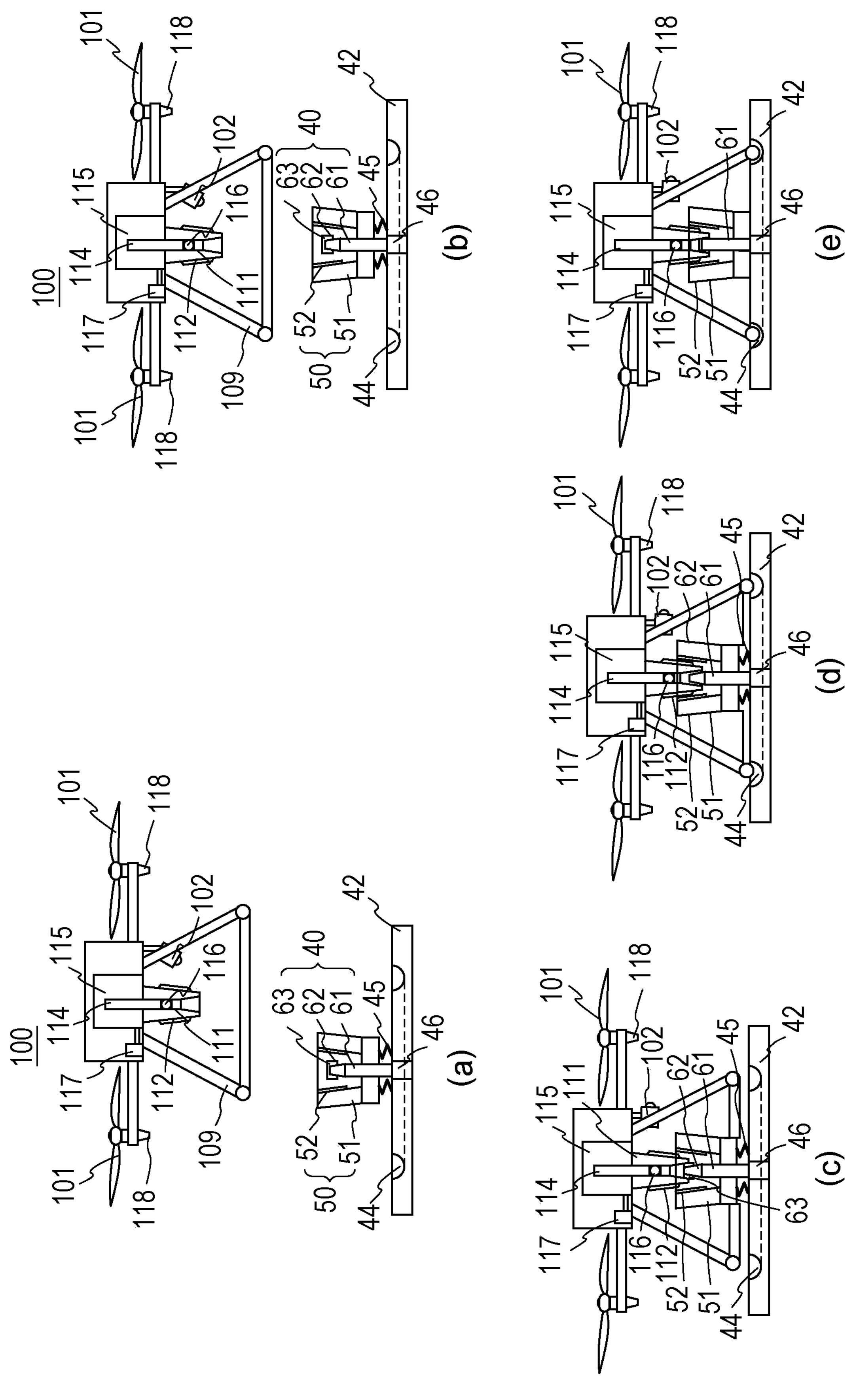
FIG. 4 is a view illustrating a state in which a drone lands on a takeoff and landing unit, in which FIG. 4(*a*) is a view illustrating a state in which the drone is diagonally above a table unit, FIG. 4(*b*) is a view illustrating a state in which the drone is above the table unit, FIG. 4(*c*) is a view illustrating a state in which a tapered portion of a second engagement portion comes into contact with a packing, FIG. 4(*d*) is a view illustrating a state in which a power transmission electrode and a power reception electrode come into contact with each other, and FIG. 4(*e*) is a view illustrating a state in which a leg portion of the drone is held by a holding portion.

FIG. 4 is a view illustrating a state in which the drone 100 lands on a takeoff and landing unit, in which FIG. 4(*a*) is a view illustrating a state in which the drone 100 is diagonally above the table unit 42, FIG. 4(*b*) is a view illustrating a state in which the drone 100 is above the table unit 42, FIG. 4(*c*) is a view illustrating a state in which a tapered portion of the second engagement portion 111 comes into contact with the packing 63, FIG. 4(*d*) is a view illustrating a state in which the power transmission electrode 52 and the power reception electrode 112 come into contact with each other, and FIG. 4(*e*) is a view illustrating a state in which the leg portion 109 of the drone 100 is held by the holding portion 44.

Figure 5:
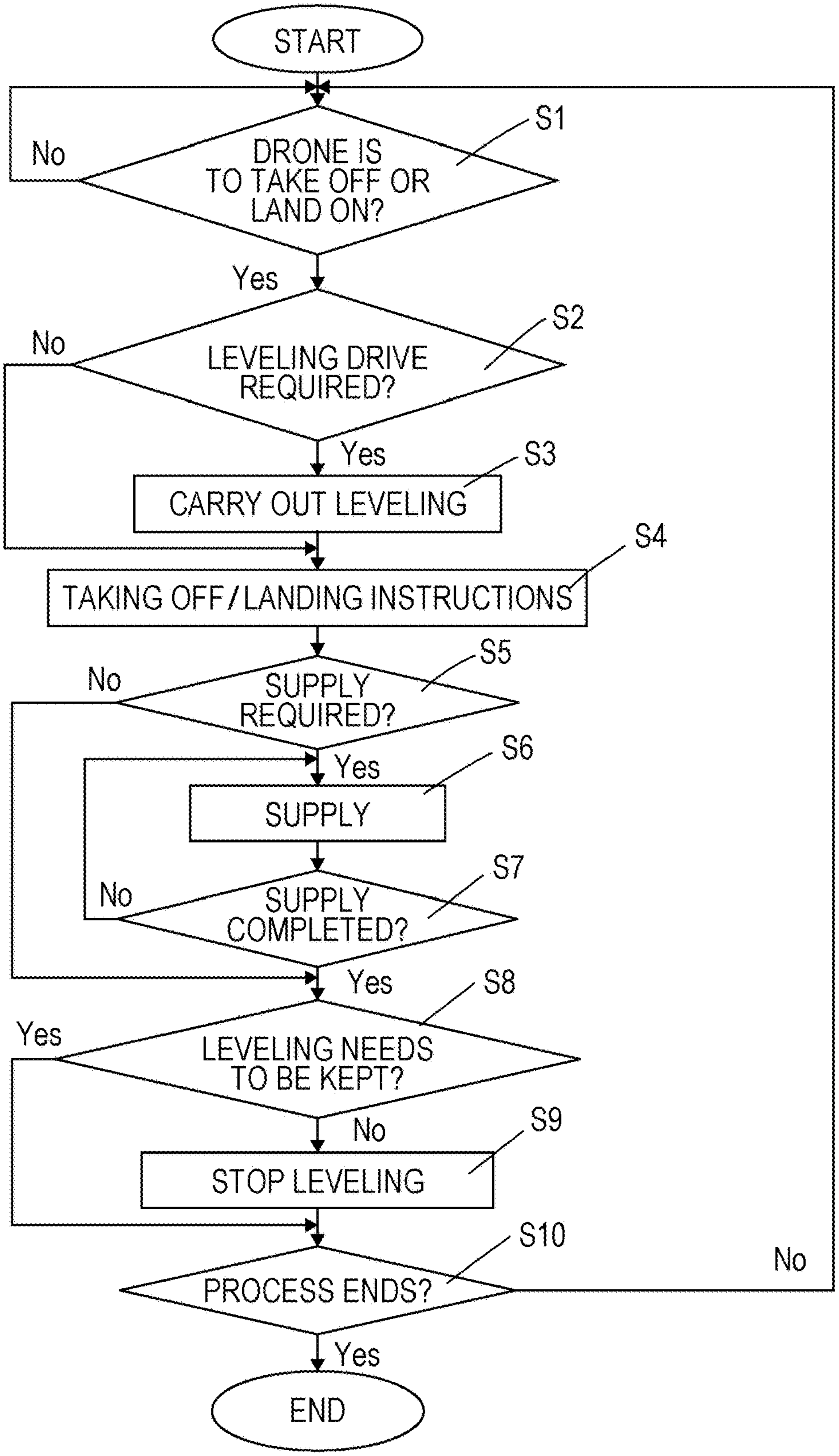
FIG. 5 is a flowchart illustrating a process executed by a control device or controller.

FIG. 5 is a flowchart of processes executed by the control device 70. Hereinafter, the operation of the conveyance device 1 and the drone 100 of the first embodiment will be described with reference to FIGS. 4 and 5.

Flowchart

The processes of the flowchart in FIG. 5 are executed, for example, when the conveyance device 1 is located on a sloped ground. Note that, in terms of energy savings, it is not preferable to drive the drive shafts 41 based on the output of the posture detection unit 43 to level the table unit 42 at all times. Accordingly, in the flowchart of FIG. 5, the table unit 42 is kept level when the drone 100 takes off and lands. Additionally, the table unit 42 is not driven by the drive shafts 41 in a case where the drone 100 does not take off even when landing on the table unit 42.

The control device 70 determines whether the drone 100 is to take off from or land on the table unit 42 (Step S1). Here, the control device 70 of the drone 100 assumes that the drone 100 is to land on the table unit 42, and the process proceeds to Step S2. The determination as to whether the drone 100 is to take off from or land on the table unit 42 may be made based on communication between the conveyance device 1 and the drone 100. Alternative, or in addition thereto, the determination as whether the drone 100 is to take off from or land on the table unit 42 may be made in response to instructions from the control device 70 to the drone 100. In addition, in a case where the drone 100 is to land on the table unit 42, the control device 70 desirably stops the movement of the conveyance device 1 by the traveling devices 10 until landing instructions are issued in Step S4 described later. On the other hand, the control device 70 may move the conveyance device 1 by the traveling devices 10 when the drone 100 takes off from the table unit 42.

When the drone 100 lands on the table unit 42, the control device 70 determines whether it is necessary to perform leveling drive for leveling the table unit 42 (Step S2). The control device 70 determines whether the leveling drive is necessary based on the output of the posture detection unit 43 (e.g., depending on a path traveled by the drone 100). Here, it is assumed that the inclination of the conveyance device 1 is a predetermined value or more, and the drone 100 cannot safely land on the table unit 42. Accordingly, the control device 70 determines Yes in Step S2, and the process proceeds to Step S3.

The control device 70 drives the three drive shafts 41 by the leveling motor 32 to level the table unit 42 (Step S3). The control device 70 does not need to level the table unit 42 completely. The control device 70 may control the posture of the table unit 42 so that the drone 100 can safely land on the table unit 42.

Note that some UAVs generate an air flow toward the downstream side by their rotor blades, which causes the main body to tilt at the time of landing. Further, some models are easier to land on if the table unit 42 is tilted in accordance with the tilt of the main body. In such a case, the control device may drive the three drive shafts 41 to tilt the table unit 42 by about 3° to 10° so that the drone 100 can easily land on according to the landing characteristics of the drone 100.

While processes in Steps S2 and S3 of the flowchart are performed, the drone 100 flies toward the table unit 42 as illustrated in FIG. 4(*a*). Specifically, the UAV control device 120 of the drone 100 flies toward the table unit 42 based on the location information of the table unit 42 and the location of the drone 100 measured by the second GNSS 108. The UAV control device 120 controls the image capturing device 102 to direct the position of the lens thereof downward to capture an image of the table unit 42.

Next, as illustrated in FIG. 4(*b*), the UAV control device 120 flies above the table unit 42 so that the first engagement portion 51 and the second engagement portion 111 can be engaged with each other.

After leveling the table unit 42 in Step S3, the control device 70 issues landing instructions to the UAV control device 120 (Step S4). The UAV control device 120 moves downward, and as illustrated in FIG. 4(*c*) moves the tapered portion of the second engagement portion 111 to the inner tapered portion of the first engagement portion 51 so that the tapered portion of the pipe portion 114 engages with the packing 63. In FIG. 4(*c*), the orientation of the lens of the image capturing device 55 is moved from the lower side to the horizontal direction side. The image capturing device 55 may set the orientation of the lens to the lower side to take an image of the state of engagement between the first engagement portion 51 and the second engagement portion 111.

As the UAV control device 120 continues to move downward, the packing 63 is elastically deformed. The power transmission electrode 52 and the power reception electrode 112 contact each other as illustrated in FIG. 4(*d*). Further, because the own weight of the drone 100 acts on the spring 45, the spring 45 is elastically deformed to be compressed.

After the joint 62 is engaged with the tapered portion of the pipe portion 114, the weight of the drone 100 acts on the spring 45. As shown in FIG. 4(*e*), the power transmission device 50 contacts the upper surface of the table unit 42, and the leg portion 109 is engaged with the holding portion 44. It is possible to provide, in the table unit 42, a sensor for detecting contact with the power transmission device 50. The control device 70 may determine that the process in Step S4 is completed when the sensor detects contact between the power transmission device 50 and the table unit 42.

The control device 70 communicates with the drone 100 to determine whether the UAV control device 120 requests power supply to the power reception device 103 and fluid supply to the fluid device 113 (Step S5). Here, it is assumed that the UAV control device 120 has requested power supply to the power reception device 103 and fluid supply to the fluid device 113, and the process proceeds to Step S6. When the UAV control device 120 requests the fluid supply to the fluid device 113, the valve of the solenoid valve 116 is opened so that the fluid can be supplied from the fluid supply unit 60.

The control device 70 performs power transmission by the power transmission device 50 and fluid supply by the fluid supply unit 60 (Step S6). The control device 70 turns on the switch (not illustrated) of the power transmission device 50 to start power supply to the power reception device 103 and drives the pump 34 to start fluid supply to the fluid device 113 by the fluid supply unit 60.

The control device 70 determines whether the power transmission by the power transmission device 50 and the fluid supply by the fluid supply unit 60 are completed (Step S7). When the charge amount of the battery 105 reaches a predetermined charge amount, the UAV control device 120 transmits a signal indicating the completion of charging to the control device 70. When the flow meter (not illustrated) provided in the tank 115 detects a predetermined flow rate, the UAV control device 120 closes the valve of the solenoid valve 116 and transmits a signal indicating the completion of the fluid supply to the control device 70.

When receiving the signal indicating the completion of charging, the control device 70 turns off the switch (not illustrated) of the power transmission device 50 to finish the power supply to the power reception device 103. Further, the control device 70 stops driving the pump 34 when receiving the signal indicating the completion of the fluid supply.

Also, in a case where the control device 70 or the UAV control device 120 issues flight instructions to the drone 100, the charging completion processing and the fluid supply completion processing as described above may be performed.

The control device 70 determines whether it is necessary to maintain the leveling of the table unit 42 (Step S8). In a case where takeoff and landing of the drone 100 are expected, a case where a route travelled by the conveyance device 1 is steep, or the like, the control device 70 determines Yes in Step S8 to appropriately drive the drive shafts 41. The control device 70 appropriately maintains the leveling state of the table unit 42, and then the process proceeds to Step S10.

On the other hand, in a case where takeoff and landing of the drone 100 are not expected, a case where a route travelled by the conveyance device 1 is a gentle slope, or the like, the control device 70 determines No in Step S8, and the process proceeds to Step S9. Further, the control device 70 may determine No in Step S8 when the image capturing device 102 of the drone 100 performs image capturing. That is, the control device 70 may prohibit the leveling unit from being driven when the image capturing device 102 performs image capturing. This is because, when the drone 100 lands on the table unit 42, the image capturing device 102 captures an image from substantially the same position as that from a driver's seat of a conventional conveyance device. Thus, it is preferable, but not necessary, to perform image capturing in consideration of the posture (inclination) of the conveyance device 1. The control device 70 stops driving the drive shafts 41 by the leveling motor 32 (Step S9), and the process proceeds to Step S10.

The control device 70 determines whether the process of the flowchart can be finished (Step S10). In a case where conveyance by the conveyance device 1 is completed or where the conveyance device 1 is turned off, the control device 70 determines Yes in Step S10, and the process of the flowchart ends.

On the other hand, in a case where takeoff and landing of the drone 100 are expected, a case where the conveyance device 1 continues the conveyance, or the like, the control device 70 determines No in Step S10. The process then proceeds to Step S1. Even in a case where the drone 100 takes off from the table unit 42, the control device 70 controls the posture of the table unit 42 based on the detection result of the posture detection unit 43. Thus, the control device 70 achieves a posture of the takeoff and landing unit where the drone 100 can easily take off.

The drone 100 of the first embodiment can be used for various purposes. As an example, a spraying drone that sprays a pesticide from the nozzle 118 over farmland can be used. As an additional example, a cleaning drone that sprays a cleaning liquid for cleaning a solar panel from the nozzle 118 onto the solar panel can be used.

As detailed above, according to the first embodiment, the control device 70 controls the posture of the table unit 42 based on the detection result of the posture detection unit 43, which achieves the conveyance device 1 where the drone 100 can easily take off and land on. Further, in a case where the drone 100 lands on the table unit 42, it is possible to charge the power reception device 103 and supply the fluid to the fluid device 113 in a stable posture. The stable posture prevents a trouble from occurring at the time of charging the power reception device 103 and supplying the fluid to the fluid device 113.

Before the leg portion 109 is held by the holding portion 44, the power transmission electrode 52 and the power reception electrode 112 are in contact with each other. The joint 62 is engaged with the tapered portion of the pipe portion 114. At this time, the power transmission device 50 is deformably supported by the spring 45. Therefore, in a case where the leg portion 109 is held by the holding portion 44, it is possible to reduce damage to the power transmission electrode 52 and the power reception electrode 112 and reduce damage to the joint 62.

Second Embodiment

Hereinafter, the second embodiment will be described with reference to FIGS. 6 and 7, but the same configurations as those of the first embodiment are denoted by the same reference signs, and description thereof will be omitted or simplified. In the second embodiment, the takeoff and landing unit of the drone 100 is provided in a hydraulic excavator 200. That is, the second embodiment uses a construction machine instead of the conveyance device 1 of the first embodiment.

Figure 6:
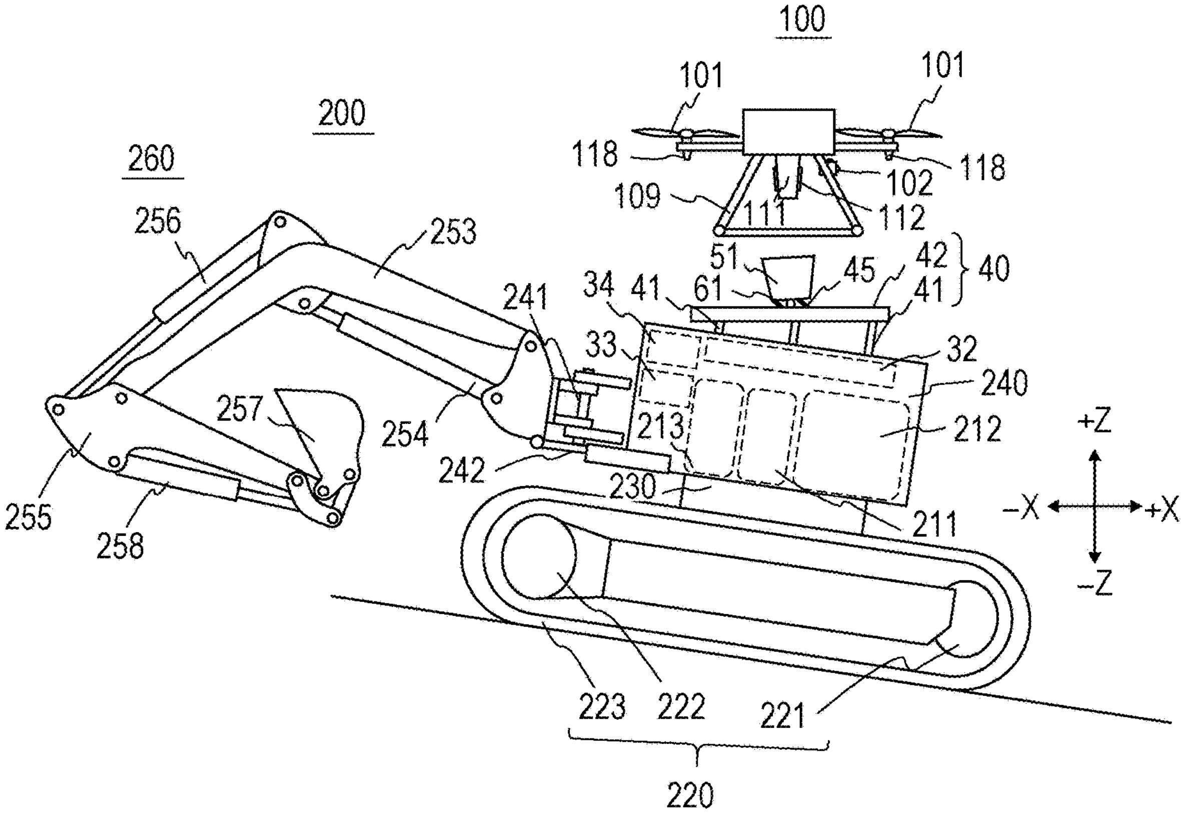
FIG. 6 is a schematic view of a hydraulic excavator according to a second embodiment.

FIG. 6 is a schematic view of the hydraulic excavator 200 according to the second embodiment. FIG. 7 is a block diagram of main parts of the hydraulic excavator 200 and the drone 100 according to the second embodiment. In FIG. 6, the holding portion 44 and the opening 46 of the leveling unit 40 are not illustrated, the power transmission electrode 52 of the power transmission device 50 is not illustrated, and each configuration of the fluid device 113 is not illustrated.

Hereinafter, a configuration of the hydraulic excavator 200 will be described with reference to FIGS. 6 and 7. As is clear from FIG. 6, the hydraulic excavator 200 of the second embodiment is a construction machine of an autonomous driving type without a driver's seat or a remote driving type. Note that the hydraulic excavator 200 may travel autonomously at a construction site and may be loaded on a trailer for transport on a public road.

The hydraulic excavator 200 of the second embodiment includes a drive system 210, a traveling device 220, a revolving device 230, a main body device 240, and a working device 260.

The drive system 210 is a drive device that drives each component of the hydraulic excavator 200. The drive system 210 includes a fuel cell 211, a fuel tank 212, and a storage battery 213 housed in the main body device 240. The fuel cell 211 is a power generator that generates electricity by electrochemical reaction of hydrogen and oxygen.

In the second embodiment, the fuel tank 212 stores hydrogen in a gaseous state, and a residual meter (not illustrated) is provided inside the fuel tank 212. The fuel tank 212 stores hydrogen compressed to several tens of MPa, and the fuel tank 212 supplies hydrogen to the fuel cell 211 via a hydrogen supply pipeline (not illustrated).

The storage battery 213 is a secondary battery and stores power generated by the fuel cell 211. The storage battery 213 can also be used as an auxiliary power supply for driving the fuel cell 211 by the stored power and supplies the power to various motors, the traveling device 220, the revolving device 230, various cylinders, the leveling motor 32, the pump 34, the power transmission device 50, and the like that constitute the hydraulic excavator 200. As described above, because the storage battery 213 is provided in the second embodiment, the battery 31 of the first embodiment can be omitted in the second embodiment.

The traveling device 220 is a caterpillar type and includes a pair of crawler belts 223 wound around idler wheels 221 and drive wheels 222. The drive wheels 222 are driven by a traveling motor 124 to drive the pair of crawler belts 223, to thereby cause the hydraulic excavator 200 to travel. The traveling motor 124 is driven by power supplied from the storage battery 213, and an in-wheel motor is employed in the first embodiment. Note that the traveling motor 124 may be a hydraulic motor.

The revolving device 230 is disposed between the traveling device 220 and the main body device 240. The revolving device 230 includes a bearing (not illustrated) and a revolving motor 231. The revolving device 230 revolves the main body device 240 and the working device 260 about the Z axis.

The main body device 240 of the first embodiment has a flat upper surface and has a cylindrical shape. The drone 100 can take off from and land on the upper surface. In the first embodiment, the main body device 240 has a cylindrical shape, but is not limited thereto, and may have any shape.

The main body device 240 includes, therein, the fuel cell 211, the fuel tank 212, the storage battery 213, and the fuel tank 212. The main body device 240 further includes the leveling motor 32, the container 33, and the pump 34 of the first embodiment.

Figure 7:
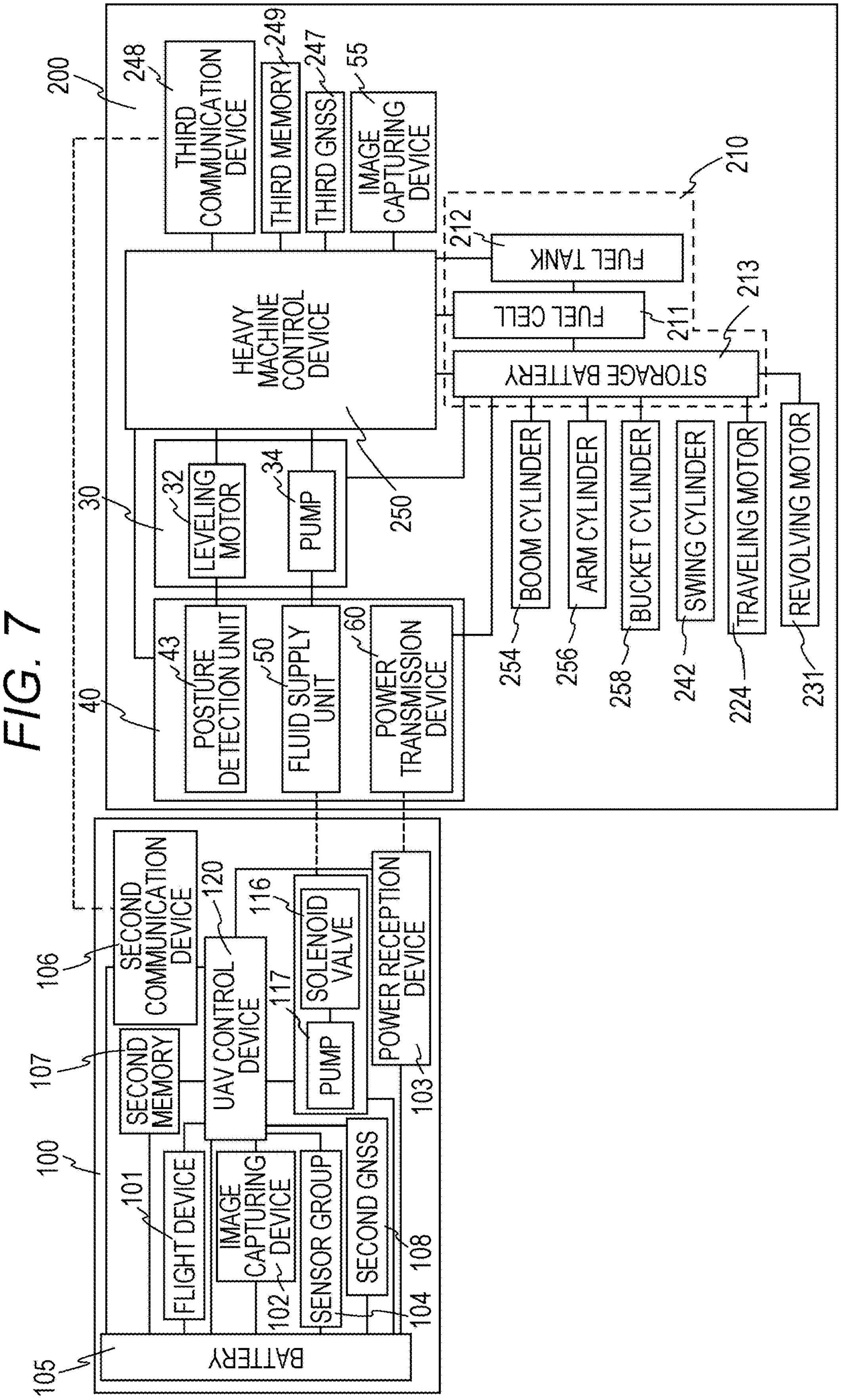
FIG. 7 is a block diagram of main parts of a hydraulic excavator and a drone according to the second embodiment.

Further, as illustrated in the block diagram of FIG. 7, the main body device 240 is provided with a third global navigation satellite system (GNSS) 247 that is a global positioning system, a third communication device 248, a third memory 249, and a heavy machine control device 250 that controls the entire hydraulic excavator 200.

A swing unit 241 is pivotally supported such that a portion connected to one end side of the main body device 240 and a portion connected to a boom 253 are rotatable around a Z axis indicating a vertical direction. A swing cylinder 242 is a cylinder having one end connected to the main body device 240 and another end connected to the swing unit 241. An extending and contracting operation of the cylinder is performed by power supplied from the storage battery 213.

The extending and contracting operation of the swing cylinder 242 rotates the working device 260 about the Z axis in FIG. 3.

The third GNSS 247 measures a position of the hydraulic excavator 200 by using an artificial satellite. The third GNSS 247 may be provided on the upper surface of the main body device 240.

The third communication device 248 is a wireless communication unit that includes a transmitter, a receiver, various circuits, and an antenna (not illustrated). The third communication device 248 accesses the second communication device 106 or a wide area network such as the Internet. In the second embodiment, the third communication device 248 transmits the location of the table unit 42 to the second communication device 106 based on the location of the hydraulic excavator 200 detected by the third GNSS 247. In addition, the third communication device 248 receives image data captured by the image capturing device 102 and a detection result detected by the sensor group 104 from the second communication device 106.

The third memory 249 is a nonvolatile memory (for example, a flash memory) that stores various types of data and programs used for driving the hydraulic excavator 200 and various types of data and programs used for the hydraulic excavator 200 to drive autonomously.

The heavy machine control device 250 is a control device that includes a CPU and controls the entire hydraulic excavator 200. In the second embodiment, the heavy machine control device 250 cooperates with the UAV control device 120 to perform landing control of the drone 100, control of a series of operations for supplying power and a fluid to the drone 100, and the like. In addition, the heavy machine control device 250 controls the posture of the leveling unit 40 based on the detection result of the posture detection unit 43. For example, the posture detection unit may be a detection sensor that detects inclination of the takeoff and landing unit.

The working device 260 includes the boom 253, a boom cylinder 254, an arm 255, an arm cylinder 256, a bucket 257 (e.g. a working accessory), and a bucket cylinder 258.

The boom 253 is a rotary L-shaped part connected to the main body device 240 via the swing unit 241 and moves relative to the main body device 240. The boom 253 is rotated by the boom cylinder 254.

The arm 255 is rotatably connected to a distal end of the boom 253. The arm 255 is rotated by the arm cylinder 256.

The bucket 257 is connected to a distal end of the arm 255 and is rotated by the bucket cylinder 258. Instead of the bucket 257 as a tool accessory, a breaker or the like can be attached to the distal end of the arm 255.

The boom cylinder 254 is a cylinder that performs an extending and retracting operation by power supplied from the storage battery 213 to drive the boom 253.

Further, the arm cylinder 256 is a cylinder that performs the extending and retracting operation by power supplied from the storage battery 213 to drive the arm 255.

In addition, the bucket cylinder 258 is a cylinder that performs the extending and retracting operation by power supplied from the storage battery 213 to drive the bucket 257.

Note that, in the first embodiment, the swing cylinder 242, the boom cylinder 254, the arm cylinder 256, and the bucket cylinder 258 are driven by the power from the storage battery 213. These cylinders may be driven by using hydraulic pressure.

The drone 100 of the second embodiment can be used for various purposes. As an example, a liquid such as water may be supplied from the nozzle 118 to an excavated object excavated by the bucket 257 to adjust the water content (water equivalent) of the excavated object. As an additional example, a liquid such as water may be supplied from the nozzle 118 to a construction site to suppress dust particles at the construction site.

Also, in the hydraulic excavator 200 of the second embodiment configured as described above, the heavy machine control device 250 controls the posture of the table unit 42 based on the detection result of the posture detection unit 43. The heavy machine control device 250 achieves a posture of the hydraulic excavator 200 where the drone 100 can easily take off and land on the hydraulic excavator. Further, in a case where the drone 100 lands on the table unit 42, it is possible to charge the power reception device 103 and supply the fluid to the fluid device 113 in a stable posture. The stable posture prevents trouble from occurring at the time of charging the power reception device 103 and supplying the fluid to the fluid device 113.

In the second embodiment, the heavy machine control device 250 preferably, but not necessarily, stops the movement of the hydraulic excavator 200 by the traveling device 220 when the drone 100 lands on the table unit 42. On the other hand, the heavy machine control device 250 may move the conveyance device 1 by the traveling device 220 when the drone 100 takes off from the table unit 42.

In the second embodiment, to avoid a collision between the drone 100 and the working device 260, the heavy machine control device 250 may transmit movement information (for example, space coordinates of movement) of the working device 260 (i.e. the movable working device 260) to the UAV control device 120.

Further, the UAV control device 120 may use the infrared sensor of the sensor group 104 to avoid a collision with the working device 260. The UAV control device 120 may use LiDAR instead of the infrared sensor. At the time of landing, the UAV control device 120 desirably approaches the table unit 42 from the other end side of the main body device 240 on which the working device 260 is not provided. After takeoff, the UAV control device 120 desirably flies toward the destination after flying to the other end side of the main body device 240 on which the working device 260 is not provided.

Third Embodiment

Figure 8:
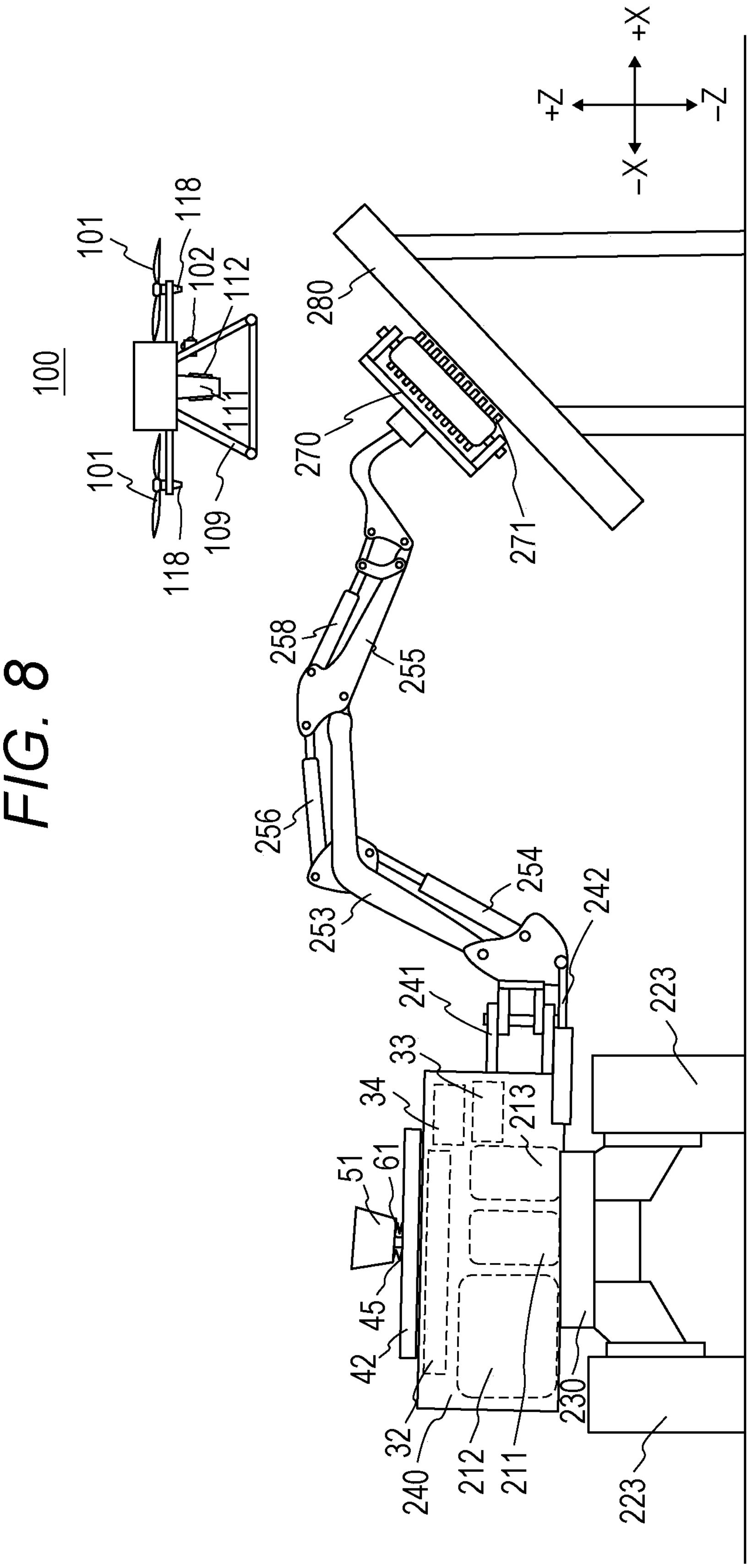
FIG. 8 is a schematic view of a hydraulic excavator according to a third embodiment.

Hereinafter, the third embodiment will be described with reference to FIG. 8, but the same configurations as those of the first and second embodiments are denoted by the same reference signs, and description thereof will be omitted or simplified. FIG. 8 is a schematic view of a hydraulic excavator 200 according to the third embodiment. The third embodiment is different in that a cleaning device 270 is provided instead of the bucket 257 of the hydraulic excavator 200 of the second embodiment.

In the third embodiment, the cleaning device 270 serves to clean a solar panel 280 in cooperation with the drone 100. The cleaning device 270 includes a rotating brush 271 and a blower (not illustrated). The cleaning device 270 is controlled by the heavy machine control device 250.

The rotating brush 271 is a brush for wiping the surface of the solar panel 280 to clean the solar panel 280. The rotating brush 271 has a structure that allows forward rotation and reverse rotation by a motor (not illustrated). A cleaning liquid or water (e.g., pure water) may be discharged from the rotating brush 271 toward the surface of the solar panel 280. The cleaning liquid or water (e.g., pure water) may be supplied using the container 33 or the pump 34.

The blower (not illustrated) blows a compressed gas (for example, air) onto the surface of the solar panel 280 to blow off a cleaning liquid or water (e.g., pure water) discharged from the nozzle 118 of the drone 100 to the surface of the solar panel 280 and a cleaning liquid or water (e.g., pure water) discharged from the rotating brush 271 to the surface of the solar panel 280. The compressed gas may be supplied using the container 33 or the pump 34. The container 33 and the pump 34 may be provided for each of the liquid and the gas.

In the third embodiment, in response to a cleaning liquid or water (e.g., pure water) being discharged from the nozzle 118 of the drone 100 to the surface of the solar panel 280, the rotating brush 271 wipes the surface of the solar panel 280, and the blower (not illustrated) blows off the cleaning liquid or water (e.g., pure water). In this way, the solar panel 280 can be efficiently cleaned. Alternatively, supplying a cleaning liquid or water (e.g., pure water) by the drone 100 may be omitted. Alternatively, or in addition thereto, the wipe by the rotating brush 271 may be omitted.

The embodiments described above are merely examples for describing the present invention, and various changes can be made without departing from the gist of the present invention. For example, a lifting mechanism may be provided in the second engagement portion 111 so thafter the leg portion 109 is held by the holding portion 44, the second engagement portion 111 may be lowered by the lifting mechanism to engage the first engagement portion 51 and the second engagement portion 111 with each other.

Further, the conveyance device 1 and the hydraulic excavator 200 may be of a type having a driver's seat. The conveyance device 1 and the hydraulic excavator 200 may have an internal combustion engine driven by light oil, ammonia, or hydrogen.

The number of working devices 260 of the hydraulic excavator 200 is not limited to one. A plurality of the working devices 260 may be provided in the main body device 240. Further, the configurations of the first to third embodiments may be appropriately combined.

The following is a list of reference signs used in this specification and in the drawings.

1 Conveyance device
10 Traveling device
11 Drive wheel
12 Driven wheels
13 Crawler belt
14 Support
15 Traveling motor
16 Center frame

17 Pair of side frame
18 Link mechanisms
**18*a*** Pair of connection members
**18*b*** Actuators
19 Coupler
20 base unit 30 Main body unit
31 Battery
32 Leveling motor
33 Container
34 Pump
40 Leveling unit
41 Drive shaft
42 Table unit
43 Posture detection unit
44 Holding portion
45 Spring
46 Opening
50 Power transmission device
51 First engagement portion
52 Power transmission electrode
55 Image capturing device
60 Fluid supply unit
61 Supply peip
62 Joint
63 Packing
66 First communication device
67 First memory
70 Control device
100 Drone
101 Flight devices
102 Image capture device
103 Power reception device
106 Second communication device
107 Second memory
109 Leg portion
111 Second engagement portion
112 Power reception electrode
113 Fluid device
114 Pipe portion
115 Tank
116 Valve
117 Pump
118 Nozzle
120 UAV control device
200 Hydraulic excavator
210 Drive system
211 Fuel cell
212 Fuel tank
213 Storage battery
220 Traveling device
221 Idler wheels
222 Drive Wheels
223 Pair of crawler belts
230 Revolving device
240 Main body device
241 Swing unit
242 swing cylinder
247 Third global navigation satellite system
248 Third communication device
249 Third memory
250 Heavy machine control device
253 Boom
254 Boom cylinder
255 Arm
256 Arm cylinder
257 Bucket
258 Bucket cylinder
260 Working device
270 Cleaning device
271 Rotating Brush
280 Solar panel

The invention claimed is:

1. A moving device, comprising:

a main body device connected to a working device that is movable at one end and travels by a traveling device;

a takeoff and landing unit that is provided on the main body device and used by an unmanned aerial vehicle to take off and land on;

a leveling unit including a table unit, wherein the leveling unit is provided in the takeoff and landing unit and in which an amount of inclination with respect to a vertical axis is adjustable;

a first communication device that communicates with a second communication device of the unmanned aerial vehicle; and a controller that instructs the first communication device to transmit position information of the leveling unit to the second communication device and that controls the leveling unit prior to landing of the unmanned aerial vehicle that travels from another end of the main body device toward the leveling unit.

2. The moving device according to claim 1, comprising:

a detection sensor that detects inclination of the takeoff and landing unit with respect to the vertical axis, wherein the controller controls the leveling unit according to a detection result of the detection sensor.

3. The moving device according to claim 2, wherein the controller controls the leveling unit in a case where the unmanned aerial vehicle takes off and lands on and determines whether to drive the leveling unit after landing of the unmanned aerial vehicle, based on a path travelled by the traveling device.

4. The moving device according to claim 2, wherein:

the unmanned aerial vehicle includes an image capturing device that performs image capturing, and the controller prohibits driving of the leveling unit in a case where the image capturing device performs image capturing at the takeoff and landing unit.

5. The moving device according to claim 1, wherein the leveling unit is provided with a power supply unit that supplies power to the unmanned aerial vehicle.

6. The moving device according to claim 5, wherein the table unit has an opening through which wiring of the power supply unit is routed.

7. The moving device according to claim 5, wherein:

the table unit is provided with a holding portion that holds the unmanned aerial vehicle, and a power reception device of the unmanned aerial vehicle is engaged with the power supply unit before the holding portion holds the unmanned aerial vehicle.

8. The moving device according to claim 1, wherein the leveling unit is provided with a fluid supply unit that supplies a fluid to the unmanned aerial vehicle.

9. The moving device according to claim 8, wherein the leveling unit has an opening through which a pipe of the fluid supply unit is routed.

10. The moving device according to claim 8, wherein:

the table unit is provided with a holding portion that holds the unmanned aerial vehicle, and a fluid device of the unmanned aerial vehicle is engaged with the fluid supply unit before the holding portion holds the unmanned aerial vehicle.

11. The moving device according to claim 1, wherein:

the leveling unit is provided with a first engagement portion engageable with the unmanned aerial vehicle, and the first engagement portion is provided in the leveling unit via an elastic member.

12. The moving device according to claim 11, wherein the first engagement portion is provided with at least one of a power supply unit that supplies power to the unmanned aerial vehicle or a fluid supply unit that supplies a fluid to the unmanned aerial vehicle.

13. An unmanned aerial device, comprising:

a flight device having a propeller;

a sensor that emits electromagnetic waves to avoid collision with a working device that is connected to one end of a moving device that includes a leveling unit on which the flight device performs takeoff and landing;

an imaging device that includes a lens to capture an image of the leveling unit, a controller that controls the flight device to move the flight device toward the leveling unit; and a second communication device that communicates with a first communication device of the moving device, wherein the second communication device receives position information of the leveling unit from the first device, and wherein the second communication device transmits the position information of the leveling unit to the controller.

14. The moving device according to claim 2, wherein the controller stops the traveling device when the unmanned aerial vehicle lands in the takeoff and landing unit.

15. The moving device according to claim 1, wherein the unmanned aerial vehicle includes a rotor blade and the controller controls the leveling unit in accordance with an air flow generated by the rotor blade.

16. The unmanned aerial device according to claim 13, further comprising:

a control device that includes a CPU to control a landing of the flight device from another end of the moving device including the leveling unit by using the imaging device.

17. The unmanned aerial device according to claim 13, wherein the imaging device captures the image of the leveling unit during operation of the leveling unit.

18. The moving device according to claim 1, wherein the working device comprises:

a boom having a first end and a distal end, the first end is connected to the one end of the main body device, wherein the boom moves relative to the main body device;

an arm rotatably connected to the distal end of the boom; and a working accessory connected to the arm.

19. The moving device according to claim 1, further comprising:

a detection device that detects a position of the moving device, wherein the controller instructs the first communication device to transmit position information of the leveling unit to the second communication device based on a detection result of the detection device.

20. The unmanned aerial device according to claim 13, wherein the lens of the imaging device is directed toward the leveling unit while the leveling unit is being leveled.

* * * * *